US005493860A

United States Patent [19]

Bjerke et al.

[11] Patent Number: 5,493,860

[45] Date of Patent: Feb. 27, 1996

[54] METHOD FOR FLUSHING A CLOSED LOOP HYDRAULIC SYSTEM

[75] Inventors: Ron A. Bjerke, Dunlap; D. Clark Hopkins, Dwight; Maury G. Mannlein, Decatur, all of Ill.

[73] Assignee: Caterpillar Inc., Peoria, Ill.

[21] Appl. No.: 132,931

[22] Filed: Oct. 7, 1993

[51] Int. Cl.[6] .......... F16D 31/00

[52] U.S. Cl. .......... 60/327; 60/454; 60/458

[58] Field of Search .......... 60/327, 453, 454, 60/455, 458; 91/432

[56] References Cited

U.S. PATENT DOCUMENTS

| | | | |
|---|---|---|---|
| 2,961,829 | 11/1960 | Weisenbach | 60/454 |
| 3,036,595 | 5/1962 | Rogers | 91/432 |

FOREIGN PATENT DOCUMENTS

| | | | |
|---|---|---|---|
| 1550948 | 7/1969 | Germany | 60/454 |

*Primary Examiner*—Edward K. Look
*Assistant Examiner*—F. Daniel Lopez
*Attorney, Agent, or Firm*—John W. Grant

[57] ABSTRACT

A method of flushing a closed loop hydraulic system utilizes a pair of adapters temporarily disposed between a drive motor and a pair of hoses during the flushing procedure. The adapters block communication between the hoses and the motor and cover the inlet/outlet ports of the motor. By connecting a case drain line to one of the adapters and running the engine to drive a charge pump, oil is circulated through the hose connected to that adapter, the case drain line, a case drain line filter and is returned to a tank. The case drain line is then switched to the other adapter so that oil from the charge pump is circulated through the other hose.

11 Claims, 2 Drawing Sheets

METHOD FOR FLUSHING A CLOSED LOOP HYDRAULIC SYSTEM

TECHNICAL FIELD

This invention relates generally to a method for flushing hydraulic systems and more particularly to a method for flushing high pressure, closed loop hydraulic systems.

BACKGROUND ART

The rotating groups of axial piston pumps and motors are easily damaged by contaminants passing therethrough. The pumps and motors of a closed loop system are much more prone to damage by contaminants within the system since the majority of the fluid within a closed loop system is simply recirculated through the pumps and motors with only a small portion of the fluid being taken from the system and passed through a filter. Thus, one contaminant may pass through the pump and motor many times before it is finally filtered out. The contaminant may inflict some damage to the pump and motor each time it passes therethrough. Thus, it is imperative that the fluid within the closed loop system be kept free of contaminants at all times.

One way of minimizing the risk of contaminants passing through the pump and motor in a closed loop system is to flush the lines or hoses communicating the pump with the motor prior to operating the system after repairs are made to the system. It is extremely important that the hoses be flushed if the repairs include replacing one or more of the hoses.

One of the problems heretofore encountered has been the lack of any simple and economical method of flushing a high pressure, closed loop system particularly when the repairs are made at the job site. The heretofore known method includes disconnecting the hoses from the pump and connecting the ends together and then disconnecting the hoses from the motor and connecting the ends to a self-contained flushing apparatus having its own pump, tank and filter. While that flushing procedure was usually done when the repairs were made by a service technician who had the proper equipment, it was seldom done when the repairs were made by an owner not having the proper equipment.

In view of the above, it would be desirable to have a simple and inexpensive apparatus and a method of using the apparatus for easily flushing a high pressure, closed loop hydraulic system in the field after repairs are made thereto. The method utilizes a charge pump normally associated with a closed loop hydraulic system thereby eliminating the need for the self-contained flushing apparatus. The components used for the present flushing method are inexpensive and can be easily installed with tools an owner-operator would normally have.

DISCLOSURE OF THE INVENTION

In one aspect of the present invention a method is provided for flushing a closed loop hydraulic system having a rotary motor, a reversible variable displacement pump driven by a prime mover and connected to the rotary motor through a pair of hoses, a case drain line connected to the motor, and a charge pump driven by the prime mover and communicating with the hoses. The method comprises the steps of disconnecting the hoses and the case drain line from the motor, connecting the case drain line to the first hose through a first adapter, blocking the second hose from the atmosphere with a second adapter, driving the charge pump for a predetermined period of time for circulating oil through the first hose and the case drain line, disconnecting the case drain line from the first hose, connecting the case drain line to the second hose through one of the adapters, blocking the first hose from the atmosphere with the other adapter, driving the charge pump for a predetermined period of time for circulating oil through the second hose and the case drain line, and filtering the oil passing through the case drain line.

The present invention is directed to overcoming one or more of the problems as set forth above.

BEST MODE FOR CARRYING OUT THE INVENTION

Figure 1:
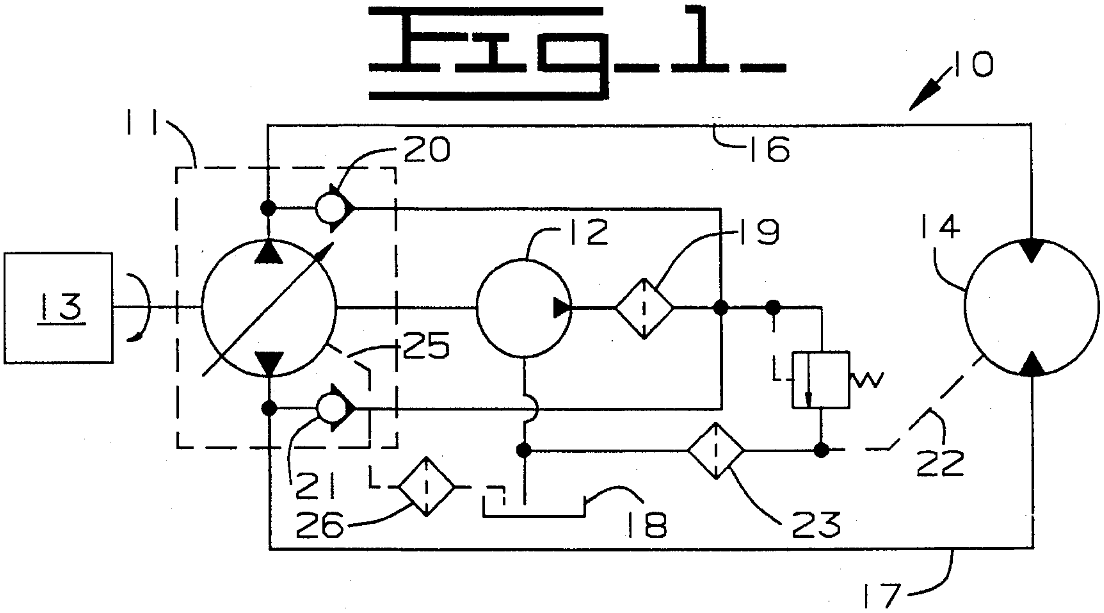
FIG. 1 is a schematic illustration of a typical high pressure, closed loop hydraulic system.
Figure 2:
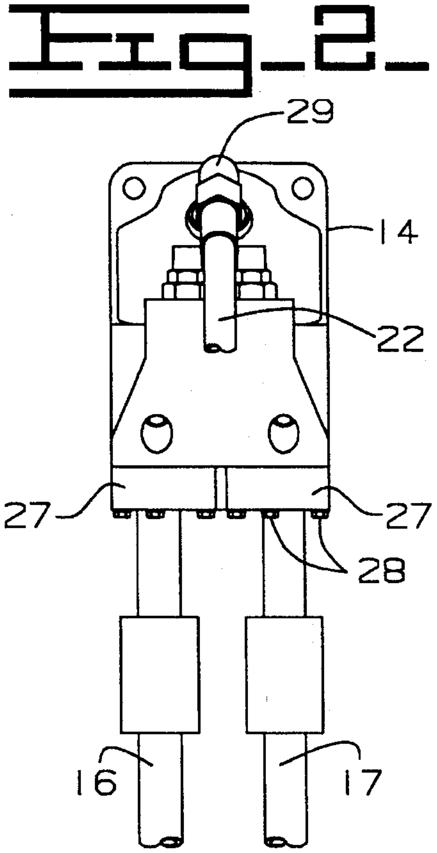
FIG. 2 is an elevational view of a typical hydraulic motor.
Figure 3:
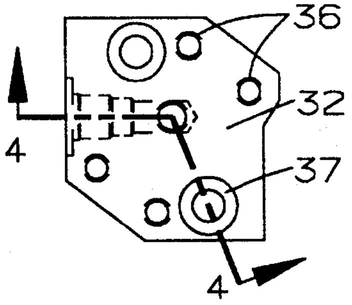
FIG. 3 is a plan view of a component used in the flushing method of the present embodiment.
Figure 4:
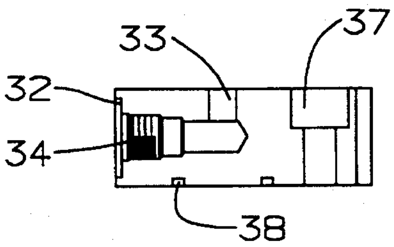
FIG. 4 is a cross-sectional view taken along line 4—4 of FIG. 3.

Referring now to FIG. 1, a typical high pressure, closed loop hydraulic system 10 includes a variable displacement over center pump 11 and a fixed displacement charge pump 12 driven by a prime mover such as an engine 13. The pump 11 is connected to a rotary drive motor 14 through a pair of flexible hoses 16, 17. The charge pump 12 draws fluid from a tank 18 and is connected to the hoses 16, 17 through a filter 19 and a pair of check valves 20, 21 that are provided as part of the variable displacement pump 11. A flexible motor case drain line 22 communicates the drive motor 14 with the tank 18 through a case drain filter 23. A pump case drain line 25 communicates the pump 11 with the tank 18 through a filter 26. As shown in FIG. 2, the hoses 16, 17 are typically connected to the motor with a flange 27 and a plurality of bolts 28. The pump case drain line 22 is typically connected to the motor through a threaded fitting 29.

Figure 5:
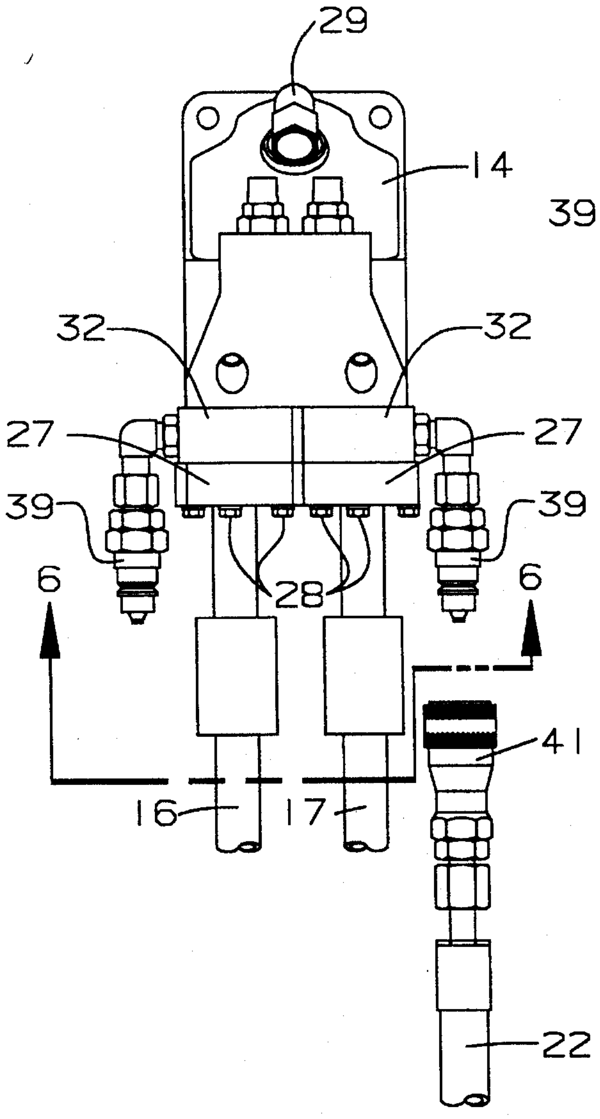
FIG. 5 is an elevational view of the motor of FIG. 2 with the flushing apparatus attached thereto.
Figure 6:
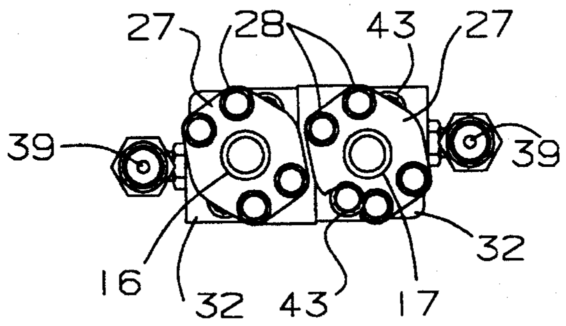
FIG. 6 is a partially sectional view taken along line 6—6 of FIG. 5.

Referring to FIGS. 3–6 a flushing apparatus 31 for carrying out the method of the present invention includes a pair of adapters 32 each having an inlet port 33 communicating with an outlet port 34, a plurality of threaded holes 36, a pair of stepped cap screw holes 37 and an annular o-ring seal groove 38. A disconnect coupling 39 is suitably threadably connected to the outlet port 34 and a mating disconnect coupling 41 is connected to the drain line 22. A cap 42 is shown in FIG. 5 sealingly connected to the fitting 29. The adapters 32 are each releasably connected to the motor 14 with a pair of capscrews 43.

Industrial Applicability

The method of flushing the closed loop hydraulic system 10 with the flushing apparatus 31 includes the steps of disconnecting the hoses 16, 17 and the case drain line 22 from the motor; connecting the case drain line 22 to the hose 16, for example, through a first adapter 32; blocking the hose 17 from the atmosphere with a second adapter 32; driving the charge pump 12 for a predetermined period of time for circulating oil through the hose 16 and the case drain line 22; disconnecting the case drain line from the hose 16; connecting the case drain line to the hose 17 through one of the adapters 32; blocking the hose 16 from the atmosphere with the other adapter 32; driving the charge pump 12 for a predetermined period of time for circulating oil through the hose 17 and the case drain line 22; and filtering the oil passing through the case drain line 22. More specifically, the hoses 16, 17 are disconnected from the motor by removing the bolts 28 to release the flanges 27 and the adapters 32 are connected to the motor with a plurality of capscrews 43 so that the inlet/outlet ports (not shown) of the motor opened by disconnecting the hoses are covered. The hoses 16, 17 are then connected to the adapters by threading the bolts 28 into the threaded holes of the adapters. To minimize the amount of time that any of the components are open to the atmosphere, preferably, one of the hoses, 16 for example, is disconnected from the motor, one of the adapters (32) is connected to the motor where the hose 16 was disconnected and the hose 16 connected to that adapter prior to disconnecting the hose 17 from the motor. The above steps are preferably then sequentially repeated for the hose 17.

The method also includes the steps of capping the case drain line opening (not shown) in the motor 14 with the cap 42 after the case drain line 22 is disconnected from the motor; connecting the case drain line 22 to one of the adapters so that the case drain line communicates with the outlet port 34 of that adapter; and blocking the outlet port of the other adapter. The step of connecting the case drain line to one of the adapters includes connecting the quick disconnect couplers 39 to the adapters so that they communicate with the outlet port 34; fastening the mating quick disconnect coupling 41 to the case drain line 22 and connecting the coupling 41 to one of the couplings 39. The couplings 39 include a mechanism for blocking fluid flow therethrough when the coupling 41 is not connected thereto so that the outlets 34 of the adapters are automatically blocked. Alternatively, the quick connect couplings could be omitted and the case drain line 22 suitably connected to the adapters with conventional threaded fittings in which case blocking the outlet port of the other adapter could be accomplished by a threaded plug.

After the above noted steps are completed, the engine 13 is started to drive the charge pump 12 for a predetermined period of time. The charge pump 12 circulates fluid from the tank 18 through the appropriate check valve 20, 21, through one of the hoses 16, 17, and the adapter associated with the one hose, with the fluid being returned to the tank through the case drain line 22 and the filter 23. The check valves 20, 21 automatically direct the fluid from the charge pump 12 through the hose that is connected to the adapter that has the case drain line connected thereto. After the engine has been operated for the predetermined period of time, the case drain line is switched from the one adapter to the other adapter to circulate fluid through the other hose for the predetermined period of time. Any contaminants flushed from the hoses are filtered from the oil by the filter 23. The engine is operated at a speed to maintain the charge pump pressure between minimum and maximum predetermined pressures. This assures adequate fluid flow through the hoses for flushing the contaminants therefrom while maintaining cooling flow of fluid through the variable displacement pump 11. It may be necessary with some variable displacement pumps to disable the controls thereof to maintain the pump at a neutral position.

After oil has been circulated through both hoses 16, 17, the engine is stopped and the hoses and case drain line reconnected to the motor, preferably one at a time. The final step includes replacing all of the filters in the closed loop system.

In view of the above, it is readily apparent that the present invention provides an improved method of flushing a high pressure, closed loop hydraulic system in a simple and inexpensive manner by utilizing some of the system components for the flushing procedure. Specifically, the system charge pump is employed as a source of oil for flushing the hoses while the case drain line returns the oil passing through the hoses to the tank. A simple and inexpensive adapter is provided to both isolate the hoses from the motor and communicate the hoses with the case drain line. Finally, the case drain line filter is utilized to capture the contaminants flushed from the hoses.

Other aspects, objects and advantages of this invention can be obtained from a study of the drawings, the disclosure and the appended claims.

We claim:

1. A method of flushing a closed loop hydraulic system having a motor, a reversible variable displacement pump driven by a prime mover and connected to the motor through first and second flexible hoses, a flexible case drain line connected to the motor and to a tank, and a charge pump driven by the prime mover and communicating with the hoses comprising the steps of;

(a) disconnecting the hoses and the case drain line from the motor;

(b) connecting the case drain line to the first hose through a first adapter;

(c) blocking the second hose from the atmosphere with a second adapter;

(d) driving the charge pump for a predetermined period of time for circulating oil through the first hose and the case drain line;

(e) disconnecting the case drain line from the first hose;

(f) connecting the case drain line to the second hose through one of the adapters;

(g) blocking the first hose from the atmosphere with the other adapter;

(h) driving the charge pump for a predetermined period of time for circulating oil through the second hose and the case drain line; and (i) filtering the oil passing through the case drain line.

2. The method of claim 1 including the step of covering inlet/outlet ports of the motor after the hoses are disconnected from the motor.

3. The method of claim 2 including the step of covering a case drain port in the motor after the case drain line is disconnected from the motor.

4. The method of claim 2 wherein the step of covering the inlet/outlet port includes the step of fastening the first and second adapters to the motor.

5. The method of claim 4 wherein the first and second adapters are substantially identical and the one adapter of step (f) is the second adapter and the other adapter of step (g) is the first adapter.

6. The method of claim 5 wherein the steps of driving the charge pump includes the step of starting the prime mover.

7. The method of claim 1 including the step of maintaining the variable displacement pump at a neutral position.

8. A method of flushing a closed loop hydraulic system having a motor, a reversible variable displacement pump driven by a prime mover and connected to the motor through a pair of hoses, a case drain line connected to the motor, and a charge pump driven by the prime mover and communicating with the hose comprising the steps of:

disconnecting the hoses from the motor;

connecting a pair of adapters to the motor;

connecting the hoses to the adapters so that each hose communicates with an inlet port in the associated adapter;

disconnecting the case drain line from the motor;

capping a case drain opening in the motor;

connecting the case drain line to one of the adapters so that the case drain line communicates with an outlet port of the adapter;

blocking on outlet port in the other adapter;

driving the charge pump for a predetermined period of time;

switching the case drain line to the other adapter; and driving the charge pump for the predetermined period of time.

9. The method of claim 8 including sequentially disconnecting one of the hoses from the motor, connecting one of the adapters to the motor, and connecting the one hose to the one adapter prior to disconnecting the other hose from the motor.

10. The method of claim 8 wherein the step of connecting the case drain line to one of the adapters includes the steps of fastening a quick disconnect coupling to each of the adapters fastening a mating quick connect coupling to the case drain line and connecting the mating quick connect coupling to the quick connect coupling attached to the one adapter.

11. The method of claim 8 including the step of utilizing existing hardware to connect the hoses to the adapters.

* * * * *